(12) United States Patent
Hoyt et al.

(10) Patent No.: US 11,821,172 B2
(45) Date of Patent: Nov. 21, 2023

(54) AUTOMATED LOAD DROP BASED ON MACHINE CONFIGURATION

(71) Applicant: Caterpillar Inc., Peoria, IL (US)

(72) Inventors: Daniel W. Hoyt, Brimfield, IL (US); Curtis John Caldwell, Metamora, IL (US); Aaron J. Gnagey, Morton, IL (US)

(73) Assignee: Caterpillar Inc., Peoria, IL (US)

( * ) Notice: Subject to any disclaimer, the term of this patent is extended or adjusted under 35 U.S.C. 154(b) by 497 days.

(21) Appl. No.: 16/948,995

(22) Filed: Oct. 8, 2020

(65) Prior Publication Data
US 2022/0112686 A1    Apr. 14, 2022

(51) Int. Cl.
*E02F 9/20*    (2006.01)

(52) U.S. Cl.
CPC .......... *E02F 9/2054* (2013.01); *E02F 9/2037* (2013.01); *E02F 9/2041* (2013.01)

(58) Field of Classification Search
None
See application file for complete search history.

(56) References Cited

U.S. PATENT DOCUMENTS

| | | | |
|---|---|---|---|
| 9,079,662 B1* | 7/2015 | Duffy ................... | B64C 37/02 |
| 2007/0200032 A1* | 8/2007 | Eadie ................... | B64D 1/22 |
| | | | 244/137.4 |
| 2007/0221600 A1* | 9/2007 | Davis ................... | B66C 23/44 |
| | | | 212/270 |
| 2009/0125196 A1 | 5/2009 | Velazquez et al. | |
| 2015/0158576 A1* | 6/2015 | Jones ................... | B64D 1/22 |
| | | | 701/2 |
| 2016/0312435 A1* | 10/2016 | Voelz ................... | E02F 3/46 |
| 2018/0060811 A1* | 3/2018 | Boesen ................. | H04R 1/1091 |

FOREIGN PATENT DOCUMENTS

| | | |
|---|---|---|
| CN | 202400736 U | 8/2012 |
| CN | 102398867 B | 7/2013 |
| CN | 102390779 B | 1/2014 |
| CN | 107697820 A | 2/2018 |

OTHER PUBLICATIONS

Nam et al., Cooperative control system of the floating cranes for the dual lifting, Apr. 12, 2017, Science Direct (Year: 2017).*
Tsutsui et al., Control Systems for Floating Cranes, Nov. 27, 2007, Kobelco Technology Review (Year: 2007).*

* cited by examiner

*Primary Examiner* — Christian Chace
*Assistant Examiner* — Scott R Jagolinzer
(74) *Attorney, Agent, or Firm* — Harrity & Harrity, LLP

(57) ABSTRACT

A controller may obtain, from one or more first devices of a first machine, first information regarding a load associated with a first portion of an object. The first portion, of the object, may be carried by an implement of the first machine and a second portion, of the object, may be carried by an implement of a second machine. The controller may obtain, from one or more second devices of the first machine, second information regarding an orientation of the first machine. The controller may determine, based on the first information and a threshold derived based on the second information, that a load drop condition is satisfied; perform a first action associated with dropping the load; and transmit, to the second machine, information regarding the first action to cause the second machine to perform a second action.

20 Claims, 4 Drawing Sheets

AUTOMATED LOAD DROP BASED ON MACHINE CONFIGURATION

TECHNICAL FIELD

The present disclosure relates generally to a load of a machine and, for example, to dropping a load of a machine based on machine configuration.

BACKGROUND

A pipelayer is a machine that is used for installing large, heavy pipeline segments into and/or above ground. Due to the large and heavy nature of the pipeline segments, the pipelayer may experience an overload condition. The overload condition may cause unintended effects on the pipelayer and/or the operation of the pipelayer, such as the pipelayer tipping over. A skilled operator may sense that such unintended effects are imminent and may, accordingly, adjust the operation of the pipelayer to prevent the unintended effects from occurring. In some instances, the pipelayer may be provided with a feature that enables the pipeline segments to be dropped in order to prevent such unintended effects from occurring. In this regard, one way to adjust the operation of the pipelayer is to use the feature to drop the pipeline segments.

An unskilled operator (or a distracted operator) may be unable to sense that such unintended effects are imminent and may, therefore, be unable to adjust the operation of the pipelayer to prevent the unintended effects. As a result, the unintended effects may occur and may cause damage to the pipelayer and/or to the pipeline segments. Additionally, the unintended effects may cause similar unintended effects on the operation of one or more other pipelayers working, in conjunction with the pipelayer, to install the pipeline segments. Similarly, the pipelayer dropping the load may cause similar unintended effects on the operation of one or more other pipelayers.

Chinese Patent Application Publication Number CN202400736 (the '736 publication) discloses a detector for detecting a tipping state of a crane, which is provided with a tipping parameter detector and a controller. The '736 publication discloses that the controller is used for determining whether the crane is tipped or not according to detection data of the tipping parameter detector. While the '736 publication discloses that the controller is used for determining whether the crane is tipping, the '736 publication does not address the issues related to the operator and related to one or more cranes working in conjunction with the crane, as discussed above.

The controller of the present disclosure solves one or more of the problems set forth above and/or other problems in the art.

SUMMARY

A method performed by a controller of a first machine includes obtaining, from one or more first devices of the first machine, first information regarding a load associated with a first portion of an object, the first portion, of the object, being carried by an implement of the first machine and a second portion, of the object, being carried by an implement of a second machine; obtaining, from one or more second devices of the first machine, second information regarding an orientation of the first machine; determining, based on the first information and a threshold derived based on the second information, that a load drop condition is satisfied; performing a first action associated with dropping the load based on determining that the load drop condition is satisfied; and transmitting, to the second machine, information regarding the first action to cause the second machine to perform a second action based on the information regarding the first action.

A machine includes one or more memories; and one or more processors configured to: selectively obtain one or more of: first information, from one or more first devices of the machine, regarding a load associated with a portion of an object, the portion of the object being carried by an implement of the machine; second information, from one or more second devices of the first machine, regarding an orientation of the machine; determine, based on the first information and a threshold derived based on the second information, that a load drop condition is satisfied; and perform an action associated with dropping the load based on determining that the load drop condition is satisfied.

A system includes one or more devices of a first machine; and a controller, of the first machine, configured to: receive information transmitted by a second machine, the second machine transmitting the information based on detecting that a drop of a load, being carried by an implement of the second machine, is occurring or is imminent; and perform an action relating to a load, being carried by an implement of the first machine, based on receiving the information, the action being performed based on receiving the information from the first machine.

DETAILED DESCRIPTION

This disclosure relates to a controller that determines whether a load, carried by an implement of a machine, is to be dropped and that causes an action to be performed when the load is to be dropped. The term "machine" may refer to a machine that performs an operation associated with an industry such as, for example, mining, construction, farming, transportation, or another industry. Moreover, one or more implements may be connected to the machine.

Figure 1:
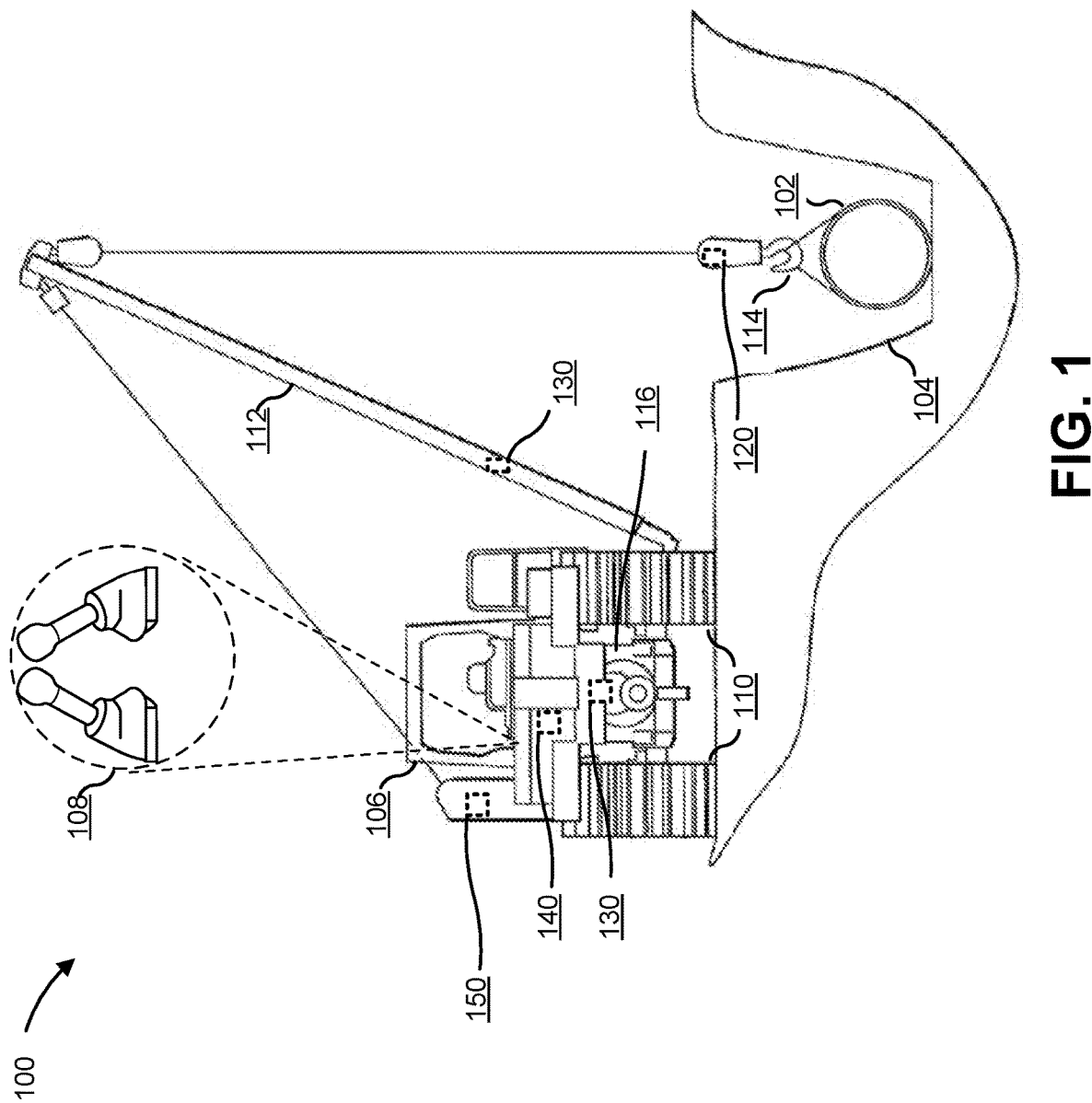
FIG. 1 is a diagram of an example machine described herein.

FIG. 1 is a diagram of an example machine 100 described herein. As shown in FIG. 1, machine 100 is embodied as a pipelayer laying a pipeline segment 102 in a trench 104. While FIG. 1 shows a single pipelayer laying a single pipeline segment 102, example implementations include a plurality of pipelayers laying a plurality of pipeline segments 102 in a coordinated manner. The plurality of pipeline segments 102 may form a pipeline. For example, the plurality of pipeline segments 102 may be connected to each other (e.g., via one or more weld points) to form the pipeline.

As shown in FIG. 1, machine 100 includes an operator cabin 106, operator controls 108, ground engaging members 110, a boom 112, a hook component 114, and a chassis 116. Operator cabin 106 may include an integrated display (not shown) and operator controls 108, such as, for example, integrated joysticks. Operator controls 108 may include one or more input components to generate signals to control movement of machine 100 (e.g., movement of ground engaging members 110, boom 112, hook component 114, and/or the like). As an example, operator controls 108 may include hydraulic controls (e.g., for controlling one or more implements of machine 100), a gear shift lever, a parking brake, and/or the like. Operator controls 108 may further include a hook drop control that may be used to cause a load (carried by hook component 114) to be dropped. The hook drop control may include a button, a lever, a switch, and/or the like that may be used to cause a load (carried by hook component 114) to be dropped.

As shown in FIG. 1, ground engaging members 110 includes tracks that are composed of a series of interlinked track shoes in an oval track and/or high drive configuration. Alternatively, ground engaging members 110 may include wheels, rollers, and/or the like. Boom 112 may extend to a particular height at a particular angle from machine 100. One or more lifting cables may extend from the body of machine 100 to hook component 114 via boom 112 to assist in lifting and/or placing the pipeline segment 102. Hook component 114 may include a cradle and/or other mechanism for securing, carrying, holding, lifting, and/or placing the pipeline segment 102. While FIG. 1 shows a pipelayer, the present disclosure may be applicable to another type of machine with a lifting assembly.

As shown in FIG. 1, machine 100 includes a load sensor device 120, one or more orientation sensors 130, a controller 140 (e.g., an electronic control module (ECM)), and a wireless communication component 150.

Load sensor device 120 may include one or more sensor devices that are capable of sensing a load carried by hook component 114. For example, load sensor device 120 may include a load sensor, a strain gauge sensor, a piezoelectric sensor, and/or the like.

Orientation sensor 130 includes one or more devices that are capable of receiving, generating, storing, processing, and/or providing signals indicating a position and orientation of a component, of machine 100, on which orientation sensor 130 is installed. Orientation sensor 130 may include an inertial measurement unit, an angle sensor, a linear distance measuring device, and/or another similar device. In some instances, IMU may include one or more accelerometers and/or one or more gyroscopes. The one or more accelerometers and/or the one or more gyroscopes generate and provide signals that can be used to determine a position and orientation of orientation sensor 130 relative to a frame of reference and, accordingly, used to determine a position and orientation of the component. The component of machine 100 may include boom 112, hook component 114, chassis 116, a counterweight of machine 100 (not shown), and/or the like. As shown in FIG. 1, a first orientation sensor 130 is installed on boom 112 and may generate signals indicating an overhang of boom 112. The overhang of boom 112 may refer to a distance between machine 100 (and/or chassis 116) and boom 112 as boom 112 extends away from machine 100 (and/or chassis 116). As shown in FIG. 1, a second orientation sensor 130 is installed on chassis 116 and may generate signals indicating a roll and/or a pitch of machine 100.

In some instances, a plurality of load sensor devices 120 and orientation sensors 130 may form a load monitoring system that determines a load threshold (e.g., a load limit) associated with hook component 114 and/or determines when the load threshold is satisfied (e.g., by a load carried by hook component 114).

Controller 140 may control and/or monitor operations of machine 100. For example, controller 140 may control and/or monitor the operations of machine 100 based on signals from operator controls 108, load sensor device 120, one or more orientation sensors 130, and/or the like.

Wireless communication component 150 may include one or more devices that are capable of communicating with one or more other machines. For example, wireless communication component 150 may obtain, from controller 140, information (e.g., information relating to dropping a load associated with hook component 114) and may transmit the information to one or more other machines, as described herein.

Wireless communication component 150 may include a transceiver, a separate transmitter and receiver, an antenna, and/or the like. Wireless communication component 150 may communicate with the one or more machines using a short-range wireless communication protocol such as, for example, BLUETOOTH® Low-Energy, BLUETOOTH®, Wi-Fi, near-field communication (NFC), Z-Wave, ZigBee, Institute of Electrical and Electronics Engineers (IEEE) 802.154, and/or the like.

Additionally, or alternatively, wireless communication component 150 may communicate with the one or more machines via a network that includes one or more wired and/or wireless networks, such as, for example, a wireless local area network (LAN), a cellular network (e.g., a long-term evolution (LTE) network, a code division multiple access (CDMA) network, a 3G network, a 4G network, a 5G network, or another type of cellular network), a public land mobile network (PLMN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

As indicated above, FIG. 1 is provided as an example. Other examples may differ from what was described in connection with FIG. 1.

Figure 2:
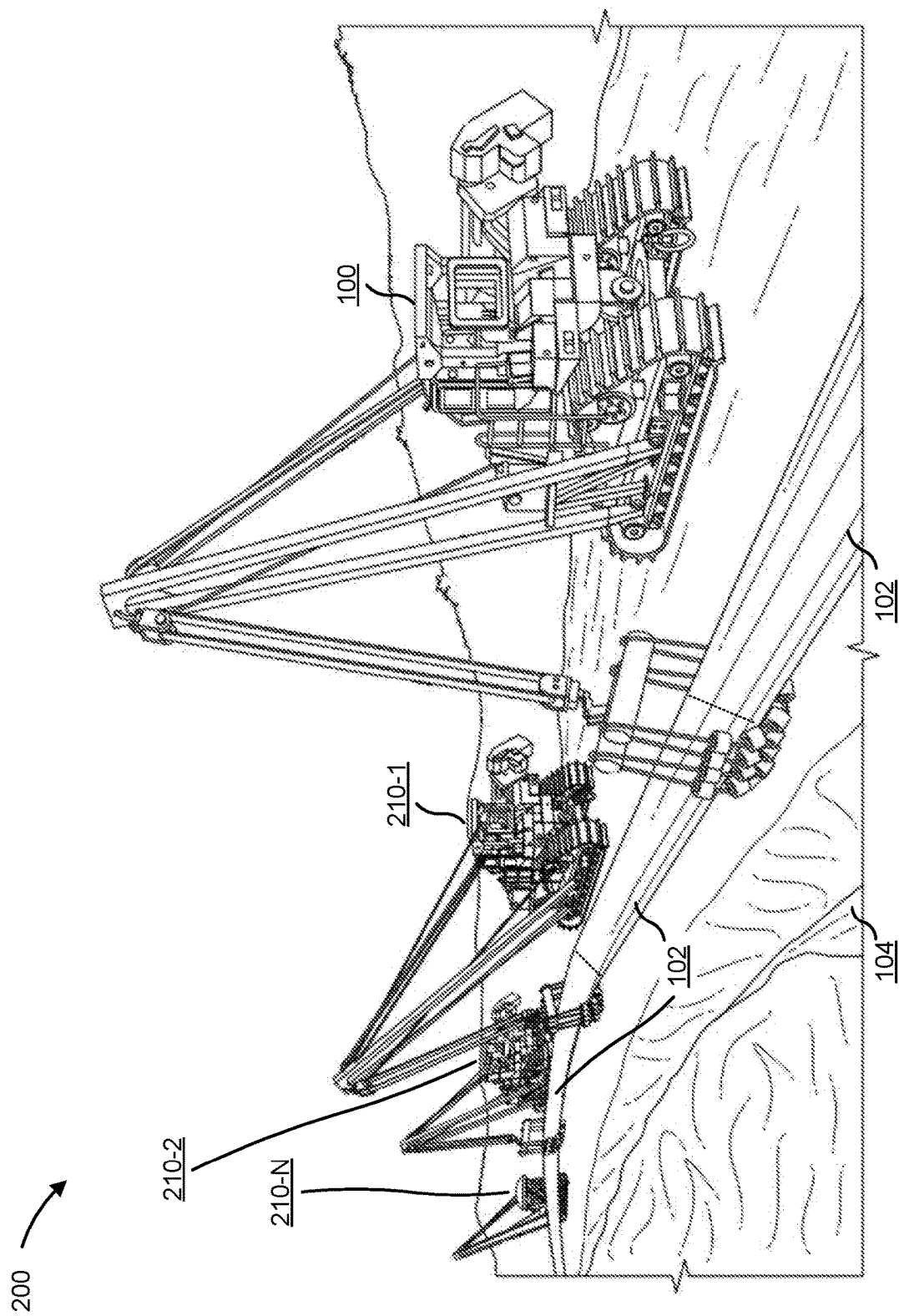
FIG. 2 is a diagram of an example implementation described herein.

FIG. 2 is a diagram of an example implementation 200 described herein. Example implementation 200 of FIG. 2 includes a plurality of pipelayers laying a plurality of pipeline segments 102 (e.g., forming a pipeline) in a trench 104 in a coordinated manner. The plurality of pipelayers may include machine 100 and machines 210-1 to 210-N (N≥1) (hereinafter referred to collectively as machines 210, and individually as machine 210). Machines 210 may include one or more load sensor devices 120, one or more orientation sensors 130, a controller 140, and/or a wireless communication component 150, as described herein in relation to FIG. 1.

As indicated above, FIG. 2 is provided as an example. Other examples may differ from what was described in connection with FIG. 2.

Figure 3:
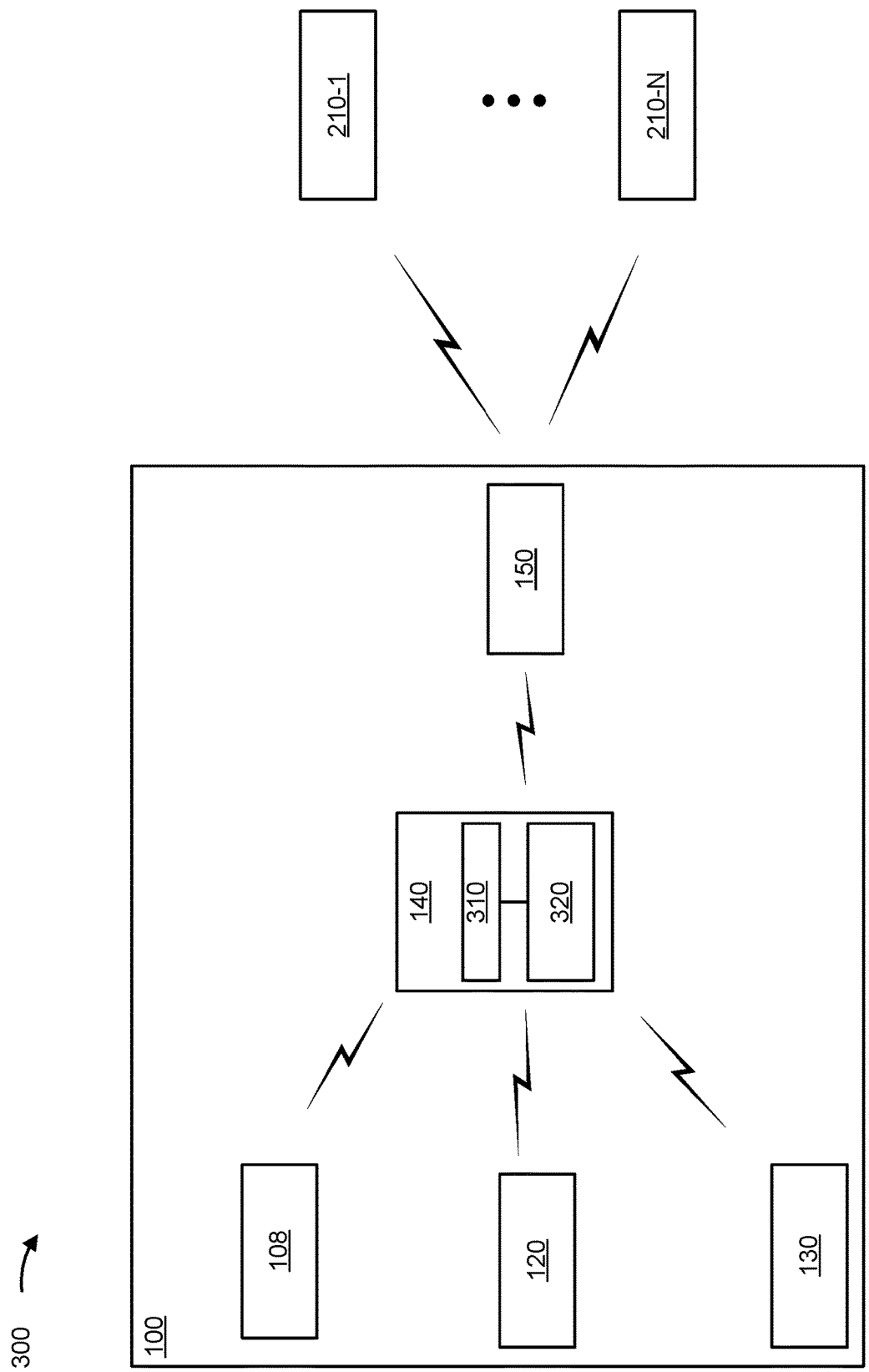
FIG. 3 is diagram of an example system, described herein, that may be implemented in association with the machine of FIGS. 1 and 2.

FIG. 3 is a diagram of an example system 300, described herein, that may be implemented in association with the machine of FIG. 1 (e.g., machine 100). As shown in FIG. 3, system 300 includes machine 100 and machines 210-1 to 210-N. Machine 100 includes operator controls 108, load sensor device 120, one or more orientation sensors 130, controller 140, and wireless communication component 150.

Operator controls 108 may transmit operator control information to controller 140 to enable controller 140 to determine whether machine 100 is to drop a load carried (or secured) by hook component 114. The operator control information may include information regarding hydraulic controls of machine 100 (e.g., whether one or more implements of machine 100 are in a lockout mode), information identifying a current gear of machine 100, information indicating whether a parking brake of machine 100 is engaged or disengaged, and/or the like.

Operator controls 108 may transmit the operator control information each time an operator of machine 100 uses operator controls 108 to control an operation of machine 100, may transmit the operator control information periodically (e.g., every minute, every hour, upon occurrence of a trigger, and/or the like), may transmit the operator control information based on a request from controller 140, and/or the like.

Load sensor device 120 may be configured to transmit load information to controller 140 to enable controller 140 to determine whether machine 100 is to drop the load carried (or secured) by hook component 114. The load information may include information identifying a weight, a mass, a volume and/or the like of the load.

Load sensor device 120 may be configured to transmit the load information to controller 140 periodically (e.g., every second, every minute, upon occurrence of a trigger, and/or the like). In some examples, load sensor device 120 may be preconfigured with a period of time for transmitting the load information. Alternatively, the period of time for transmitting the load information may be determined by an operator associated with machine 100. Alternatively, the period of time for transmitting the load information may be determined by controller 140 (e.g., based on historical load transmission data regarding machine 100).

The historical load transmission data may include historical data regarding periods of time for transmitting the load information, frequency of movements of machine 100, and/or the like. In some examples, load sensor device 120 may be configured to transmit the load information to controller 140 based on requests from controller 140. For instance, controller 140 may transmit a request for the load information based on detecting a movement of machine 100 (e.g., based on information from orientation sensor 130), based on a request for the load information from an operator of machine 100, and/or the like.

Orientation sensor 130 may be configured to transmit stability information to controller 140 to enable controller 140 to determine whether machine 100 is to drop the load carried (or secured) by hook component 114. The stability information may include information regarding an orientation of machine 100, information indicating whether machine 100 is tipping, information indicating a speed of machine 100, and/or the like.

The information regarding the orientation of machine 100 may include information regarding a roll of machine 100 (e.g., a roll of machine 100, a roll rate of machine 100, and/or the like), information regarding a pitch of machine 100 (e.g., a pitch of machine 100, a pitch rate of machine 100, and/or the like), and/or information regarding a linkage of machine 100. The information regarding the linkage may include information indicating an orientation of boom 112, information indicating a position of boom 112, information indicating an overhang of boom 112, information regarding a direction of the load, information regarding a skew associated with the load, and/or similar information.

Orientation sensor 130 may be configured to transmit the stability information to controller 140 periodically (e.g., every second, every minute, upon occurrence of a trigger, and/or the like). In some examples, orientation sensor 130 may be preconfigured with a period of time for transmitting the stability information. Alternatively, the period of time for transmitting the stability information may be determined by an operator associated with machine 100. Alternatively, the period of time for transmitting the stability information may be determined by controller 140 (e.g., based on historical stability transmission data regarding machine 100).

The historical stability transmission data may include historical data regarding periods of time for transmitting the stability information, frequency of movements of machine 100, and/or the like. In some examples, orientation sensor 130 may be configured to transmit the stability information to controller 140 based on requests from controller 140. For instance, controller 140 may transmit a request for the stability information based on the load information, based on detecting a movement of machine 100, based on a request for the stability information from an operator of machine 100, and/or the like.

Controller 140 may include one or more processors 310 (referred to herein individually as "processor 310," and collectively as "processors 310"), and one or more memories 320 (referred to herein individually as "memory 320," and collectively as "memories 320"). A processor 310 is implemented in hardware, firmware, and/or a combination of hardware and software. Processor 310 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. A processor 310 may be capable of being programmed to perform a function.

Memory 320 includes a random-access memory (RAM), a read only memory (ROM), and/or another type of dynamic or static storage device (e.g., a flash memory, a magnetic memory, and/or an optical memory) that stores information and/or instructions for use by a processor 310 to perform a function. For example, when performing a function, controller 140 (e.g., using a processor 310 and a memory 320) may obtain the operator control information from operator controls 108, the load information from load sensor device 120 and/or the stability information from orientation sensor 130. Controller 140 may determine whether the load carried by hook component 114 is to be dropped based on the operator control information, the load information, and/or the stability information, as explained in more detail below.

Wireless communication component 150 may be configured to communicate with one or more machines 210. For example, wireless communication component 150 may be configured to transmit, to the one or more machines 210, hook drop information indicating whether the load carried by hook component 114 is to be dropped. As an example, the load (carried by hook component 114) may correspond to a portion of an object and the one or more machines 210 may carry one or more loads corresponding to one or more other portions of the object.

The hook drop information may be generated by controller 140 (e.g., based on determining whether the load is to be dropped) and may be transmitted, by wireless communication component 150, to the one or more machines 210. Controller 140 may determine whether the load carried by hook component 114 is to be dropped based on the load information, the stability information, and/or the operator control information, as explained in more detail below.

Controller 140 may obtain the load information from load sensor device 120 in a manner similar to the manner described above. For example, controller 140 may obtain the load information periodically, may obtain the load information periodically based on transmitting a request (for the load information) to load sensor device 120, and/or the like. As an example, controller 140 may transmit a request for the load information based on detecting movement of machine 100 (e.g., based on obtaining information from orientation sensor 130).

For instance, controller 140 may transmit a request for the load information based on the information from orientation sensor 130 indicating that machine 100 is in motion, based on the information (e.g., the stability information) from orientation sensor 130 indicating that a roll of machine 100 satisfies a roll threshold (or a roll rate of machine 100 satisfied a roll rate threshold), based on the information (e.g., the stability information) from orientation sensor 130 indicating that a pitch of machine 100 satisfies a pitch threshold (or a pitch rate of machine 100 satisfies a pitch rate threshold), and/or the like.

Controller 140 may obtain the stability information from one or more orientation sensor 130 in a manner similar to the manner described above. For example, controller 140 may obtain the stability information periodically, may obtain the stability information based on transmitting a request (for the stability information) to the one or more orientation sensor 130, and/or the like. As an example, controller 140 may transmit a request for the stability information based on detecting movement of machine (e.g., based on obtaining information from the one or more orientation sensor 130), based on detecting that a load of machine satisfies a load threshold, and/or the like.

Controller 140 may obtain the operator control information from operator controls 108 in a manner similar to the manner described above. For example, controller 140 may obtain the operator control information from operator controls 108 based on the operator of machine 100 using operator controls 108 to control an operation of machine 100, obtain the operator control information periodically from operator controls 108, and/or the like.

Controller 140 may determine whether a load drop condition is satisfied based on the load information, the stability information, and/or the operator control information. The load drop condition may correspond to a condition that requires the load carried by hook component 114 to be dropped to avoid unintended effect on the operation of machine 100. As an example, controller 140 may determine whether the load drop condition is satisfied based on determining whether the load, carried by hook component 114, satisfies the load threshold. For instance, controller 140 may compare the load (identified the load information) and the load threshold and may determine that the load drop condition is satisfied based on the load satisfying the load threshold.

In some instances, the load threshold may correspond to a preconfigured maximum load (e.g., maximum weight, mass, volume, and/or the like) to be carried by hook component 114. Controller 140 and/or load sensor device 120 may be preconfigured with information identifying the preconfigured maximum load. The information identifying the preconfigured maximum load may be stored in a memory associated with machine 100 (e.g., memory 320).

In some examples, the load threshold may be derived based on the stability information. The load threshold may be adjusted based on the stability information. For example, controller 140 may adjust the load threshold (e.g., the preconfigured maximum load) based on the stability information. For instance, controller 140 may decrease the load threshold as the roll of machine 100 (or the roll rate of machine 100) increases, as the pitch of machine 100 (or the pitch rate of machine 100) increases, as the overhang of boom 112 increases, as the speed of machine 100 increases, and/or the like. In some implementations, controller 140 may determine the load threshold based on historical data such as, for example, historical stability information, historical load data, and/or the like. The historical load data may identify historical loads that, in conjunction with historical stability information, cause a load drop condition.

The load and the load threshold may be indicative of a likelihood of machine 100 tipping. For example, the likelihood of machine 100 tipping may increase as the load approaches the load threshold.

Additionally, or alternatively, controller 140 may determine whether the load drop condition is satisfied based on determining whether the roll of machine 100 (e.g., identified in the stability information) satisfies the roll threshold and/or whether the roll rate of machine 100 (e.g., identified in the stability information) satisfies the roll rate threshold. For example, controller 140 may determine that the load drop condition is satisfied based on the roll of machine 100 satisfying the roll threshold and/or based on the roll rate of machine 100 satisfying the roll rate threshold.

The roll threshold may be determined (e.g., by controller 140) based on historical data such as, for example, historical roll data, a historical roll threshold, historical load data, and/or the like. Similarly, the roll rate threshold may be determined (e.g., by controller 140) based on historical data such as, for example, historical roll rate data, a historical roll rate threshold, historical load data, and/or the like. The historical load data may identify historical loads that cause a load drop condition (e.g., in conjunction with historical rolls or historical roll rates).

In some instances, if controller 140 determines that the roll of machine 100 (e.g., identified in the stability information) satisfies the roll threshold and/or that the roll rate of machine 100 satisfies the roll rate threshold, controller 140 may determine (e.g., based on the load information) whether the load satisfies the load threshold in order to determine whether the load drop condition is satisfied. For example, controller 140 may determine that the load drop condition is not satisfied if controller 140 determines (e.g., based on the load information) that the load does not satisfy the load threshold (e.g., adjusted based on the roll and/or the roll rate of machine 100). Alternatively, controller 140 may determine that the load drop condition is not satisfied if controller 140 determines (e.g., based on information from load sensor device 120) that hook component 114 is not carrying a load.

The roll and the roll threshold and/or the roll rate and the roll rate threshold may be indicative of a likelihood of machine 100 tipping. For example, the likelihood of machine 100 tipping may increase as the roll approaches the roll threshold and/or as the roll rate approaches the roll rate threshold.

Additionally, or alternatively, controller 140 may determine whether the load drop condition is satisfied based on determining whether the pitch of machine 100 (e.g., identified in the stability information) satisfies the pitch threshold and/or whether the pitch rate of machine 100 (e.g., identified in the stability information) satisfies the pitch rate threshold. For example, controller 140 may determine that the load drop condition is satisfied based on the pitch of machine 100 satisfying the pitch threshold and/or based on the pitch rate of machine 100 satisfying the pitch rate threshold.

The pitch threshold may be determined (e.g., by controller 140) based on historical data such as, for example, historical pitch data, a historical pitch threshold, historical load data, and/or the like. Similarly, the pitch rate threshold may be determined (e.g., by controller 140) based on historical data such as, for example, historical pitch rate data, a historical pitch rate threshold, historical load data, and/or the like. The historical load data may identify historical loads that cause a load drop condition (e.g., in conjunction with historical pitch or historical pitch rates).

In some instances, if controller 140 determines that the pitch of machine 100 (e.g., identified in the stability information) satisfies the pitch threshold and/or that the pitch rate of machine 100 (e.g., identified in the stability information) satisfies the pitch rate threshold, controller 140 may determine (e.g., based on the load information) whether the load satisfies the load threshold in order to determine whether the load drop condition is satisfied. For example, controller 140 may determine that the load drop condition is not satisfied if controller 140 determines (e.g., based on the load information) that the load does not satisfy the load threshold (e.g., adjusted based on the pitch and/or the pitch rate of machine 100). Alternatively, controller 140 may determine that the load drop condition is not satisfied if controller 140 determines (e.g., based on information from load sensor device 120) that hook component 114 is not carrying a load.

The pitch and the pitch threshold and/or the pitch rate and the pitch rate threshold may be indicative of a likelihood of machine 100 tipping. For example, the likelihood of machine 100 tipping may increase as the pitch approaches the pitch threshold and/or as the pitch rate approaches the pitch rate threshold.

Additionally, or alternatively, controller 140 may determine whether the load drop condition is satisfied based on determining whether the overhang of boom 112 (e.g., identified in the stability information) satisfies an overhang threshold and/or whether the orientation of boom 112 (e.g., identified in the stability information) satisfies an orientation threshold, in a manner similar to the manner described above (e.g., with respect to the roll and the pitch of machine 100). The overhang threshold may be determined (e.g., by controller 140) based on historical data such as, for example, historical overhang data, a historical overhang threshold, historical load data, and/or the like. The orientation threshold may be determined (e.g., by controller 140) based on historical data such as, for example, historical orientation data, a historical orientation threshold, historical load data, and/or the like. The historical load data may identify historical loads that cause a load drop condition in conjunction with corresponding historical overhang of boom 112 and/or historical orientation of boom 112.

The overhang and the overhang threshold may be indicative of a likelihood of machine 100 tipping. For example, the likelihood of machine 100 tipping may increase as the overhang approaches the overhang threshold. The orientation and the orientation threshold may be indicative of a likelihood of machine 100 tipping. For example, the likelihood of machine 100 tipping may increase as the orientation approaches the orientation threshold.

In some instances, if controller 140 determines that one or more of the thresholds discussed above are satisfied, controller 140 may analyze the operator control information prior to determining whether the load drop condition is satisfied. For example, controller 140 may determine whether the parking brake of machine 100 is engaged, whether one or more implements of machine 100 (e.g., boom 112) are in a lockout mode, and/or the like. For instance, controller 140 may determine that the load drop condition is satisfied when the parking brake is not engaged, when the one or more implements are not in a lockout mode, and/or the like. Conversely, controller 140 may determine that the load drop condition is not satisfied when the parking brake is engaged, when the one or more implements are in a lockout mode, and/or the like (because the parking brake being engaged and/or the one or more implements being in a lockout mode improve the stability of machine 100).

Controller 140 may perform a first action associated with dropping the load based on determining that the load drop condition is satisfied. For example, the first action may include controller 140 providing an alert indicating that the operator of machine 100 is to drop the load. The alert may be provided to notify the operator of machine 100 and/or other individuals (hereinafter referred to as "alerted individuals") within a vicinity of machine 100 and/or of the one or more machines 210 that the load is to be dropped. The other individuals may include a site supervisor associated with machine 100. For instance, the alert may include an audible alert, a visual alert, a tactile alert, and/or the like.

The audible alert may be provided inside and/or outside operator cabin 106 (e.g., via one or more horns, speakers, and/or the like of machine 100), devices associated with the alerted individuals (e.g., user devices), and/or the like. The visual alert may be provided for display via the integrated display of operator cabin 106, provided for display on the devices associated with the alerted individuals, provided via one or more lights of machine 100, and/or the like. The tactile alert may be provided via operator controls 108 (e.g., by causing operator controls 108 to be vibrate), via the devices associated with the alerted individuals (e.g., by causing the devices to be vibrate), and/or the like.

In some examples, the alert may cause the operator to drop the load. For example the operator may use (e.g., press) the hook drop control to cause the load to be dropped. Additionally, or alternatively, the first action may include controller 140 automatically dropping the load. For example, controller 140 may cause the load to be dropped without intervention of the operator of machine 100. In some instances, controller 140 may cause the load to be dropped if the load has not been dropped within a threshold of amount of time after providing the alert (e.g., the operator of machine 100 has not used (e.g., pressed) the hook drop control).

In addition to performing the first action, controller 140 may generate the hook drop information and transmit the hook drop information to the one or more machines 210 to cause the one or more machines 210 to perform a second action based on the hook drop information. For example, controller 140 may generate the hook drop information based on performing the first action. The hook drop information may include information indicating that the load (carried by hook component 114) is to be dropped, information indicating a threshold amount of time within which the load is to be dropped, instructions to cause the one or more machines 210 to adjust an operation of the one or more machines 210, instructions to cause the one or more machines 210 to drop the one or more loads carried by the one or more machines 210, and/or the like.

Controller 140 may determine the threshold amount of time based on the load information, the stability information, and/or the operator control information. Controller 140 may cause wireless communication component 150 to transmit the hook drop information to the one or more machines 210, based on performing the first action. Wireless communication component 150 may transmit the hook drop information to the one or more machines 210, in a manner similar to the manner described above. The hook drop information may cause the one or more machines 210 to perform the second action.

For example, the second action may include the one or more machines 210 providing a notification that the alert has been provided when the first action includes providing the alert. The one or more machines 210 may provide the notification in a manner similar to the manner in which machine 100 provides the alert. The notification may cause one or more operators of the one or more machines 210 to adjust an operation of the one or more machines 210. For example, the one or more operators may adjust a pitch, adjust a roll, adjust a speed, adjust an orientation, and/or the like of the one or more machines 210, cause parking brakes of the one or more machines 210 to be engaged, cause one or more implements of the one or more machines 210 to be in a lockout mode, and/or the like.

The second action may include the one or more machines 210 adjusting an operation of the one or more machines 210 in anticipation of the load being dropped by machine 100. For example, the one or more machines 210 may adjust a pitch, a roll, a speed, an orientation, and/or the like of the one or more machines 210, cause the parking brakes to be engaged, cause the one or more implements to be in a lockout mode, and/or the like. In some examples, the one or more machines 210 may adjust the operation (without intervention of the one or more operators) if the one or more operators do not adjust the operation of the one or more machines 210 within a threshold amount of time of providing the notification.

The second action may include the one or more machines 210 automatically dropping the one or more loads (corresponding to one or more other portions of the object) when the first action includes automatically dropping the load carried by hook component 114.

In some example, controller 140 may use a machine learning model to determine the first action and/or the hook drop information (e.g., to emulate a decision making process of a skilled operator). For example, controller 140 may input, into the machine learning model, the load information, the stability information, and/or the operator control information and the machine learning model may output information identifying the first action and/or the hook drop information.

Controller 140 may train the machine learning model using historical data associated with machine 100, associated with one or more other machines similar to machine 100, and/or the like. The one or more other machines may include similar components (e.g., similar operator controls 108, similar ground engaging members 110, similar boom 112, similar hook component 114, and/or the like), similar dimensions, similar usage, and/or the like as machine 100. The historical data may include historical load information, historical stability information, historical operator control information, historical first actions, historical hook drop information, historical thresholds (similar to the thresholds discussed above), and/or the like.

When training the machine learning model, controller 140 may portion the historical data into a training set (e.g., a set of data to train the model), a validation set (e.g., a set of data used to evaluate a fit of the model and/or to fine tune the model), a test set (e.g., a set of data used to evaluate a final fit of the model), and/or the like. Controller 140 may preprocess and/or perform dimensionality reduction to reduce the historical data to a minimum feature set. Controller 140 may train the model on this minimum feature set, thereby reducing processing to train the machine learning model, and may apply a classification technique, to the minimum feature set.

Controller 140 may use a classification technique, such as a logistic regression classification technique, a random forest classification technique, a gradient boosting machine learning (GBM) technique, and/or the like, to determine a categorical outcome (e.g., the first action to be performed). In addition to, or as an alternative to use the classification technique, controller 140 may use a naïve Bayesian classifier technique. In this case, controller 140 may perform binary recursive partitioning to split the historical data of the minimum feature set into partitions and/or branches and use the partitions and/or branches to perform predictions (e.g., the first action to be performed and/or the hook drop information).

Controller 140 may train the model using a supervised training procedure that includes receiving input to the model from a subject matter expert (e.g., one or more operators associated with machine 100 and/or the one or more machines), which may reduce an amount of time, an amount of processing resources, and/or the like to train the model relative to an unsupervised training procedure. Controller 140 may use one or more other model training techniques, such as a neural network technique, a latent semantic indexing technique, and/or the like.

After training, the machine learning model may be used to determine (or predict) the first action to be performed and/or the hook drop information. In other words, controller 140 may input, into the machine learning model, the load information, the stability information, and/or the operator control information and the machine learning model may output data relating to the first action to be performed and/or the hook drop information. The output of the model may include a score for the first action to be performed and/or the hook drop information.

The score may represent a measure of confidence of the first action to be performed and/or the hook drop information determined by the machine learning model. In this regard, controller 140 may use the first action and/or the hook drop information when the measure of confidence of the amount of wear satisfies a threshold measure of confidence.

A different device, such as a server device, may generate and train the machine learning model. The different device may provide the machine learning model for use by controller 140. The different device may update and provide (e.g., on a scheduled basis, on an on-demand basis, on a triggered basis, on a periodic basis, and/or the like) the machine learning model to controller 140. Controller 140 may update the machine learning model.

In some examples, controller 140 may monitor the load information and/or the stability information with respect to the thresholds discussed above. Based on the monitoring, as controller 140 determines that the load information and/or the stability information are approaching one or more of the thresholds discussed above, controller 140 may determine that the load condition will be satisfied if remedial actions are not taken. Accordingly, controller 140 may provide, for display, information identifying the remedial actions and information indicating that the load drop condition will be satisfied if the remedial actions are not taken. Controller 140 may cause machine 100 to perform the remedial actions to prevent the load drop condition from being satisfied if the remedial actions do not occur within a threshold amount of time.

The number and arrangement of devices and networks shown in FIG. 3 are provided as an example. In practice, there may be additional devices, fewer devices, different devices, or differently arranged devices than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of system 300 may perform one or more functions described as being performed by another set of devices of system 300.

Figure 4:
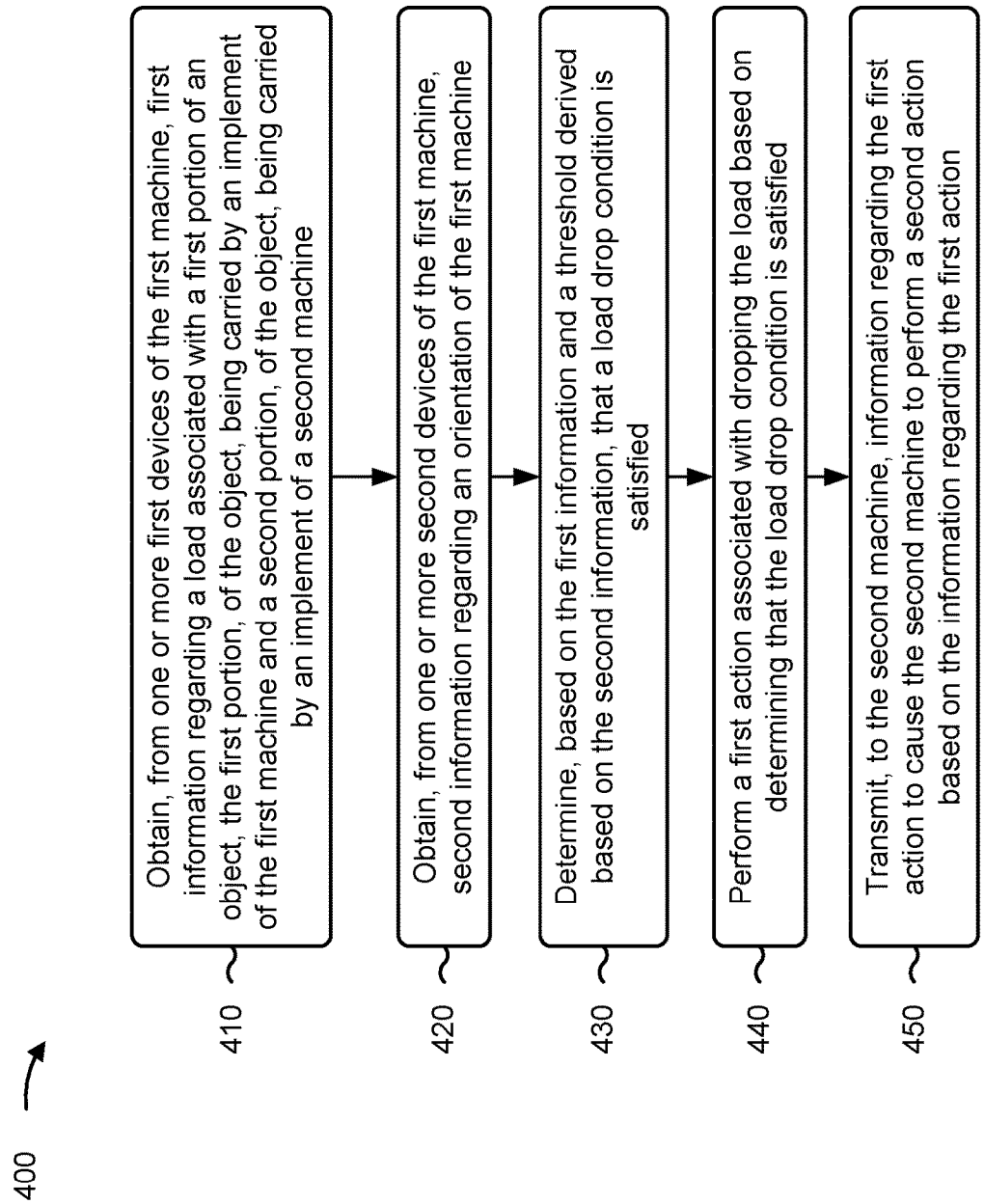
FIG. 4 is a flowchart of an example processes relating to automated load drop based on machine configuration.

FIG. 4 is a flowchart of an example process 400 associated with automated load drop based on machine configuration. In some implementations, one or more process blocks of FIG. 4 may be performed by a controller (e.g., controller 140). In some implementations, one or more process blocks of FIG. 4 may be performed by another device or a group of devices separate from or including the controller, such as operator controls (e.g., operator controls 108), a load sensor device (e.g., load sensor device 120), an orientation sensor (e.g., orientation sensor 130), and a wireless communication component (e.g., wireless communication component 150).

As shown in FIG. 4, process 400 may include obtaining, from one or more first devices of the first machine, first information regarding a load associated with a first portion of an object, the first portion, of the object, being carried by an implement of the first machine and a second portion, of the object, being carried by an implement of a second machine (block 410). For example, the controller may obtain, from one or more first devices of the first machine, first information regarding a load associated with a first portion of an object, the first portion, of the object, being carried by an implement of the first machine and a second portion, of the object, being carried by an implement of a second machine, as described above.

As further shown in FIG. 4, process 400 may include obtaining, from one or more second devices of the first machine, second information regarding an orientation of the first machine (block 420). For example, the controller may obtain, from one or more second devices of the first machine, second information regarding at least one of a pitch of the first machine, a roll of the first machine, as described above.

As further shown in FIG. 4, process 400 may include determining, based on the first information and a threshold derived based on the second information, that a load drop condition is satisfied (block 430). For example, the controller may determine, based on at least one of the first information or the second information, that a load drop condition is satisfied, as described above. Determining that the load drop condition is satisfied comprises determining, based on the first information, that the load satisfies a load threshold, and determining that the load drop condition is satisfied based determining that the load satisfies the load threshold.

Determining that the load drop condition is satisfied comprises determining, based on the second information, that at least one of the pitch satisfies a pitch threshold, or the roll satisfies a roll threshold, and determining that the load drop condition is satisfied based determining that at least one of the pitch satisfies the pitch threshold or the roll satisfies the roll threshold. Process 400 includes obtaining third information regarding one or more operator controls of the first machine, and wherein determining that the load drop condition is satisfied comprises determining that the load drop condition is satisfied based on at least one of the first information, the second information, or the third information.

As further shown in FIG. 4, process 400 may include performing a first action associated with dropping the load based on determining that the load drop condition is satisfied (block 440). For example, the controller may perform a first action associated with dropping the load based on determining that the load drop condition is satisfied, as described above. In some implementations, the load is a first load, wherein performing the first action comprises automatically dropping the first load, and wherein transmitting the information regarding the first action comprises transmitting, to the second machine, the information regarding the first action to cause the second machine to automatically drop a load associated with the second portion of the object based on the first load being dropped.

Performing the first action comprises providing an alert indicating that an first operator of the machine is to drop the load based on the load drop condition being satisfied, and wherein transmitting the information regarding the first action comprises transmitting, to the second machine, the information regarding the first action to cause the second machine to provide a notification that the alert has been provided. In some implementations, process 400 includes providing the information regarding the first action to a device of an individual associated with at least one of the first machine or the second machine.

In some implementations, process 400 includes causing the load, being carried by the implement of the first machine, to be dropped. In some implementations, process 400 includes providing an alert indicating that an operator, of the first machine, is to drop the load, being carried by the implement of the first machine, and automatically dropping the load, being carried by the implement of the first machine, when the load, being carried by the implement of the first machine, is not dropped within a threshold amount from providing the alert.

As further shown in FIG. 4, process 400 may include transmitting, to the second machine, information regarding the first action to cause the second machine to perform a second action based on the information regarding the first action (block 450). For example, the controller may transmit, to the second machine, information regarding the first action to cause the second machine to perform a second action based on the information regarding the first action, as described above. Process 400 includes providing the information regarding the first action to a device of an individual associated with at least one of the first machine or the second machine. The individual may include a site supervisor.

Process 400 includes transmitting, to the second machine, the information regarding the first action to cause the second machine to at least one of providing, to a device associated with an operator of the second machine, information indicating that an operator of the first machine has been notified to drop the load, adjusting an operation of the second machine in anticipation of the load being dropped by the first machine, or automatically dropping a load associated with the second portion, of the object, being carried by the implement of the second machine. In some implementations, process 400 includes providing an alert indicating that the drop of the load, being carried by an implement of the second machine, is occurring or is imminent.

Process 400 includes, prior to determining that the load drop condition is satisfied, determining that the load drop condition will be satisfied if remedial actions are not taken; and transmitting, to the second machine, the information regarding the first action to cause the second machine to adjust an operation of the second machine to prevent the load drop condition from being satisfied based determining that the load drop condition will be satisfied if the remedial actions are not taken.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

INDUSTRIAL APPLICABILITY

This disclosure relates to a process for determining whether a load, carried by an implement of a machine, is to be dropped and causing an action to be performed when the load is to be dropped. The disclosed process may prevent issues associated with an unskilled or distracted operator. An unskilled or distracted operator may be unable to sense the imminence of unintended effects (e.g., due to an overload condition) on the operation of the pipelayer. The inability to sense the imminence of unintended effects may waste computing resources that are used to remedy damages to the machine and/or the load as a result of the unintended effects as well as damages to one or more other machines working in conjunction with the machine.

Several advantages may be associated with the disclosed process for determining whether a load, carried by an implement of a machine, is to be dropped and causing an action to be performed when the load is to be dropped. For example, by determining that the load is to be dropped and by alerting an operator of the machine, the process may enable the operator to adjust an operation of the machine in a timely manner to prevent the unintended effects.

Additionally, by automatically dropping the load, the process may prevent damage to the machine and/or the load that would have otherwise occurred because of an unskilled or distracted operator. Furthermore, by alerting other machines that the load is to be dropped by the machine, the process may prevent damage to the other machines and loads carried by the other machines. Accordingly, the process may preserve computing resources that would have otherwise been used to remedy damages to the machine, the load carried by the machine, the other machines, and/or the loads carried by the other machines.

What is claimed is:

1. A method performed by a controller of a first machine, the method comprising:
    obtaining, from one or more first devices of the first machine, first information regarding a load associated with a first portion of an object,
        the first machine being a first pipelayer,
        the first portion, of the object, being carried by an implement of the first machine and a second portion, of the object, being carried by an implement of a second machine, and
        the second machine being a second pipelayer;
    obtaining, from one or more second devices of the first machine, second information regarding the first machine;
    determining, based on the first information and the second information, that a load drop condition will be satisfied if one or more remedial actions are not taken; and
    causing, based on determining that the load drop condition will be satisfied if the one or more remedial actions are not taken, the second machine to adjust an operation of the second machine to prevent the load drop condition from being satisfied.

2. The method of claim 1,
    wherein the load is a first load;
    wherein the method further comprises:
        automatically dropping the first load based on the load drop condition being satisfied; and
        transmitting, to the second machine, information regarding dropping the first load to cause the second machine to automatically drop a second load associated with the second portion of the object based on the first load being dropped.

3. The method of claim 1, further comprising:
    providing an alert indicating that a first operator of the first machine is to drop the load based on the load drop condition being satisfied; and
    transmitting, to the second machine, information regarding the alert to cause the second machine to provide a notification that the alert has been provided.

4. The method of claim 1, further comprising:
    providing, after the load drop condition is satisfied, information to a device of an individual associated with at least one of the first machine or the second machine.

5. The method of claim 1, further comprising:
    obtaining third information regarding one or more operator controls of the first machine;
    deriving a threshold based on the third information; and
    determining that the load drop condition is satisfied based on the threshold.

6. The method of claim 1, further comprising:
    determining whether at least one of:
        a pitch rate satisfies a pitch rate threshold, or
        a roll rate satisfies a roll rate threshold; and
    determining whether the load drop condition is satisfied based determining whether at least one of the pitch rate satisfies the pitch rate threshold or the roll rate satisfies the roll rate threshold.

7. A machine, comprising:
    one or more memories; and
    one or more processors configured to:
        obtain:
            first information, from one or more first devices of the machine, regarding a load associated with a portion of an object,
                the portion of the object being carried by an implement of the machine;
            second information, from one or more second devices of the machine, regarding an orientation of the machine;
        determine, based on the first information and a threshold derived based on the second information, that a load drop condition is satisfied; and
        perform an action associated with dropping the load based on determining that the load drop condition is satisfied,
        wherein, prior to determining that the load drop condition is satisfied, the one or more processors are configured to:
            determine that the load drop condition will be satisfied if remedial actions are not taken; and
            perform a different action based on determining that the load drop condition will be satisfied if remedial actions are not taken.

8. The machine of claim 7, wherein, when performing the action, the one or more processors are configured to:
    provide an alert indicating that the load is to be dropped within a threshold amount of time.

9. The machine of claim 7, wherein, when performing the different action, the one or more processors are configured to:
    cause the machine to perform the remedial actions to prevent the load drop condition from being satisfied.

10. The machine of claim 7, wherein the machine is a first machine, wherein a first portion, of the object, is carried by an implement of the first machine and a second portion, of the object, is carried by an implement of a second machine, wherein the action is a first action, and wherein the one or more processors are further configured to:

transmit, to the second machine, information regarding the first action to cause the second machine to perform a second action based on the information regarding the first action.

11. The machine of claim 10, wherein, when transmitting the information regarding the first action, the one or more processors are configured to:

transmit, to the second machine, the information regarding the first action to cause the second machine to at least one of:

provide, to a device associated with an operator of the second machine, information indicating that an operator of the first machine has been notified to drop the load, adjust an operation of the second machine in anticipation of the load being dropped by the first machine, or automatically drop a load associated with the second portion, of the object, being carried by the implement of the second machine.

12. The machine of claim 7, wherein, when performing the action, the one or more processors are configured to:

provide an alert indicating that an operator of the machine is to drop the load based on the load drop condition being satisfied, and automatically drop the load when the load is not dropped within a threshold amount from providing the alert.

13. The machine of claim 7, wherein, when determining that the load drop condition will be satisfied if remedial actions are not taken, the one or more processors are configured to:

determine, based on the first information or the second information, that the load drop condition will be satisfied if remedial actions are not taken; and wherein, when performing the different action, the one or more processors are configured to:

provide, for display, information identifying the remedial actions and information indicating that the load drop condition will be satisfied if the remedial actions are not taken.

14. A system, comprising:
one or more devices of a first machine; and
a controller, of the first machine, configured to:
receive first information transmitted by a second machine,
the first information being transmitted by the second machine based on detecting that a load drop condition will be satisfied if remedial actions are not taken;
adjust, based on the first information, an operation of the first machine to prevent the load drop condition from being satisfied;
receive second information transmitted by the second machine,
the second information being transmitted by the second machine based on detecting that a drop of a first load, being carried by an implement of the second machine, is occurring or is imminent; and
perform an action relating to a second load, being carried by an implement of the first machine, based on receiving the second information,
the first load and the second load including one or more pipeline segments, and
the action being performed based on receiving the second information from the second machine.

15. The system of claim 14, wherein, when performing the action, the controller is configured to:
provide an alert indicating that the drop of the first load is occurring or is imminent.

16. The system of claim 14, wherein, when performing the action, the controller is configured to:
cause the second load to be dropped.

17. The system of claim 14, wherein, when performing the action, the controller is configured to:
drop the second load based on receiving the second information.

18. The system of claim 14, wherein, when performing the action, the controller is configured to:
provide an alert indicating that an operator, of the first machine, is to drop the second load, and
automatically drop the second load when the second load is not dropped within a threshold amount from providing the alert.

19. The system of claim 14, wherein the first information is transmitted prior to the drop of the first load being detected as occurring or imminent.

20. The system of claim 14, wherein the load drop condition is satisfied when the drop of the first load is occurring or is imminent.

* * * * *